(12) United States Patent
Oshiro

(10) Patent No.: US 7,705,716 B2
(45) Date of Patent: Apr. 27, 2010

(54) APPARATUS, METHOD AND PROGRAM FOR ALARMING ABNORMALITY IN TIRE AIR-PRESSURE

(75) Inventor: Yuji Oshiro, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 735 days.

(21) Appl. No.: 11/602,380

(22) Filed: Nov. 21, 2006

(65) Prior Publication Data

US 2007/0132570 A1 Jun. 14, 2007

(30) Foreign Application Priority Data

Dec. 8, 2005 (JP) ............................. 2005-354787
Oct. 5, 2006 (JP) ............................. 2006-274373

(51) Int. Cl.
*B60C 23/00* (2006.01)
(52) U.S. Cl. ...................... 340/444; 340/442; 340/443; 73/146; 116/34 R
(58) Field of Classification Search ......... 340/442–444; 73/146; 116/34 R
See application file for complete search history.

(56) References Cited

U.S. PATENT DOCUMENTS 4,777,611 A 10/1988 Tashiro et al.

| | | |
|---|---|---|
| 6,591,668 B1 | 7/2003 | Becherer et al. |
| 6,691,059 B1 | 2/2004 | Griesser |

FOREIGN PATENT DOCUMENTS

| | | |
|---|---|---|
| EP | 0 636 503 A1 | 2/1995 |
| JP | 61-211108 A | 9/1986 |
| JP | 63-305011 A | 12/1988 |
| JP | 8-142616 A | 6/1996 |
| JP | 10-100620 A | 4/1998 |
| JP | 10-193932 A | 7/1998 |
| JP | 2000-255230 A | 9/2000 |
| JP | 2002-519239 A | 7/2002 |
| JP | 2003-506255 A | 2/2003 |
| WO | WO 00/01545 A1 | 1/2000 |
| WO | WO-01/12453 A1 | 2/2001 |

*Primary Examiner*—Benjamin C Lee
*Assistant Examiner*—Samuel J Walk
(74) *Attorney, Agent, or Firm*—Birch, Stewart, Kolasch & Birch, LLP

(57) ABSTRACT

The present invention provides an apparatus, method and program for detecting abnormality in tire air-pressure which allow detecting abnormality in tire air-pressure even if pressure in a tire is completely zero. The apparatus for alarming abnormality in tire air-pressure includes means of (1) calculating the acceleration variations of respective tires from accelerations of the tires calculated by rotational wheel velocities; (2) comparing the calculated acceleration variations of the respective tires; and (3) detecting air-pressure in a tire is abnormal when the acceleration variation of the tire is larger than the acceleration variations of the remaining tires as a result of comparison.

19 Claims, 3 Drawing Sheets

APPARATUS, METHOD AND PROGRAM FOR ALARMING ABNORMALITY IN TIRE AIR-PRESSURE

BACKGROUND OF THE INVENTION

The present invention relates to an apparatus, method and program for alarming abnormality in tire air-pressure.

It is difficult to detect decrease in tire air-pressure, in particular such as a run-flat tire which allows traveling even if air-pressure therein is zero. In the case a vehicle travels at high speed with a tire having decreased air-pressure, there has been a problem that the tire may blow out.

Various methods have been investigated to detect decrease in tire air-pressure. However, if tire air-pressure is completely zero, most of the methods cannot detect decrease in tire air-pressure since those methods conclude from acceleration variations that a road condition is bad and reject all data.

Japanese Unexamined Patent Publication No. 305011/1988 discloses a method for detecting decrease in tire air-pressure from wheel velocities of four-wheel tires on a vehicle by using a tire deflation warning system (DWS). However, this method can not detect that tire air-pressure is zero.

An object of the present invention is to provide an apparatus, method and program for detecting abnormality in tire air-pressure which allow detecting abnormality of a tire air-pressure even if a tire air-pressure is completely zero.

SUMMARY OF THE INVENTION

An aspect of the present invention relates to an apparatus for alarming abnormality in tire aire pressure, including means of (1) calculating the acceleration variations of respective tires from accelerations of the tires calculated by rotational wheel velocities; (2) comparing the calculated acceleration variations of the respective tires; and (3) determining that air-pressure of a tire is abnormal when the acceleration variation of the tire is larger than the acceleration variations of the remaining tires as a result of comparison.

Preferably, the means (3) is a means of determining that air-pressure of a tire is abnormal only in the case the acceleration variation of the tire is more than or equal to a threshold 1 and less than a threshold 2 derived by multiplying a coefficient which is at least 1 and the maximum acceleration variation among the acceleration variations of the remaining tires when the acceleration variation of the tire is larger than the acceleration variations of the remaining tires.

Preferably, the means (3) is a means of determining that air-pressure of a tire is abnormal in the case the acceleration variation of the tire is more than a threshold 3 and the maximum acceleration variation among the acceleration variations of the remaining tires is less than a threshold 4 when the acceleration variation of the tire is larger than the acceleration variations of the remaining tires.

Preferably, the apparatus further includes means (4) of determining that air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be zero by the means (3).

A further aspect of the present invention relates to a method for alarming abnormality in tire air-pressure, including steps of (1) calculating the acceleration variations of respective tires from accelerations of the tires calculated by rotational wheel velocities; (2) comparing the calculated acceleration variations of the respective tires; and (3) determining that air-pressure in a tire is abnormal when the acceleration variation of the tire is larger than the acceleration variations of remaining tires as a result of comparison.

Preferably, the step (3) is a step of determining that air-pressure of a tire is abnormal only in the case the acceleration variation of the tire is more than or equal to a threshold 1 and less than a threshold 2 derived by multiplying a coefficient which is at least 1 and the maximum acceleration variation among the acceleration variations of the remaining tires when acceleration variation of the tire is larger than the acceleration variations of the remaining tires.

Preferably, the step (3) is a step of determining that air-pressure of a tire is abnormal in the case the acceleration variation of the tire is more than a threshold 3 and the maximum acceleration variation among the acceleration variations of the remaining tires is less than a threshold 4 when the acceleration variation of the tire is larger than the acceleration variations of the remaining tires.

Preferably, the method further includes a step (4) of determining that air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be zero in the step (3).

A further aspect of the present invention relates to a program for alarming abnormality in a tire air-pressure, the program making a computer execute the procedure of (1) calculating the acceleration variations of respective tires from accelerations of the tires calculated by rotational wheel velocities; (2) comparing the calculated acceleration variations of the respective tires; and (3) determining that air-pressure in a tire is abnormal when the acceleration variation of the tire is larger than the acceleration variations of the remaining tires as a result of comparison.

Preferably, the procedure (3) is a procedure of determining that air-pressure of a tire is abnormal only in the case the acceleration variation of the tire is more than or equal to a threshold 1 and less than a threshold 2 derived by multiplying a coefficient which is at least 1 and the maximum acceleration variation among the acceleration variations of the remaining tires when acceleration variation of the tire is larger than the acceleration variations of the remaining tires.

Preferably, the procedure (3) is a procedure of determining that air-pressure of a tire is abnormal in the case the acceleration variation of the tire is more than a threshold 3 and the maximum acceleration variation among the acceleration variations of the remaining tires is less than a threshold 4 when the acceleration variation of the tire is larger than the acceleration variations of the remaining tires.

Preferably, the apparatus further includes a procedure (4) of determining that air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be zero in the procedure (3).

According to the present invention, it is possible to provide an apparatus, method and program for alarming abnormality in tire air-pressure which can detect that air-pressure in a tire is zero by detecting that the acceleration variation of a tire is larger than the acceleration variations of the remaining tires as a result of comparison made for the acceleration variations of respective tires.

DETAILED DESCRIPTION

Embodiment

An apparatus for alarming abnormality in tire air-pressure according to one Embodiment of the present invention includes means of (1) calculating the acceleration variations of respective tires from accelerations of the tires calculated by rotational wheel velocities; (2) comparing the calculated acceleration variations of the respective tires; and (3) detecting air-pressure in a tire is abnormal when the acceleration variation of the tire is larger than the acceleration variations of the remaining tires as a result of comparison.

Hereinafter, an apparatus for alarming abnormality in tire air-pressure according to the present invention is explained by referring to the attached drawings.

Figure 1:
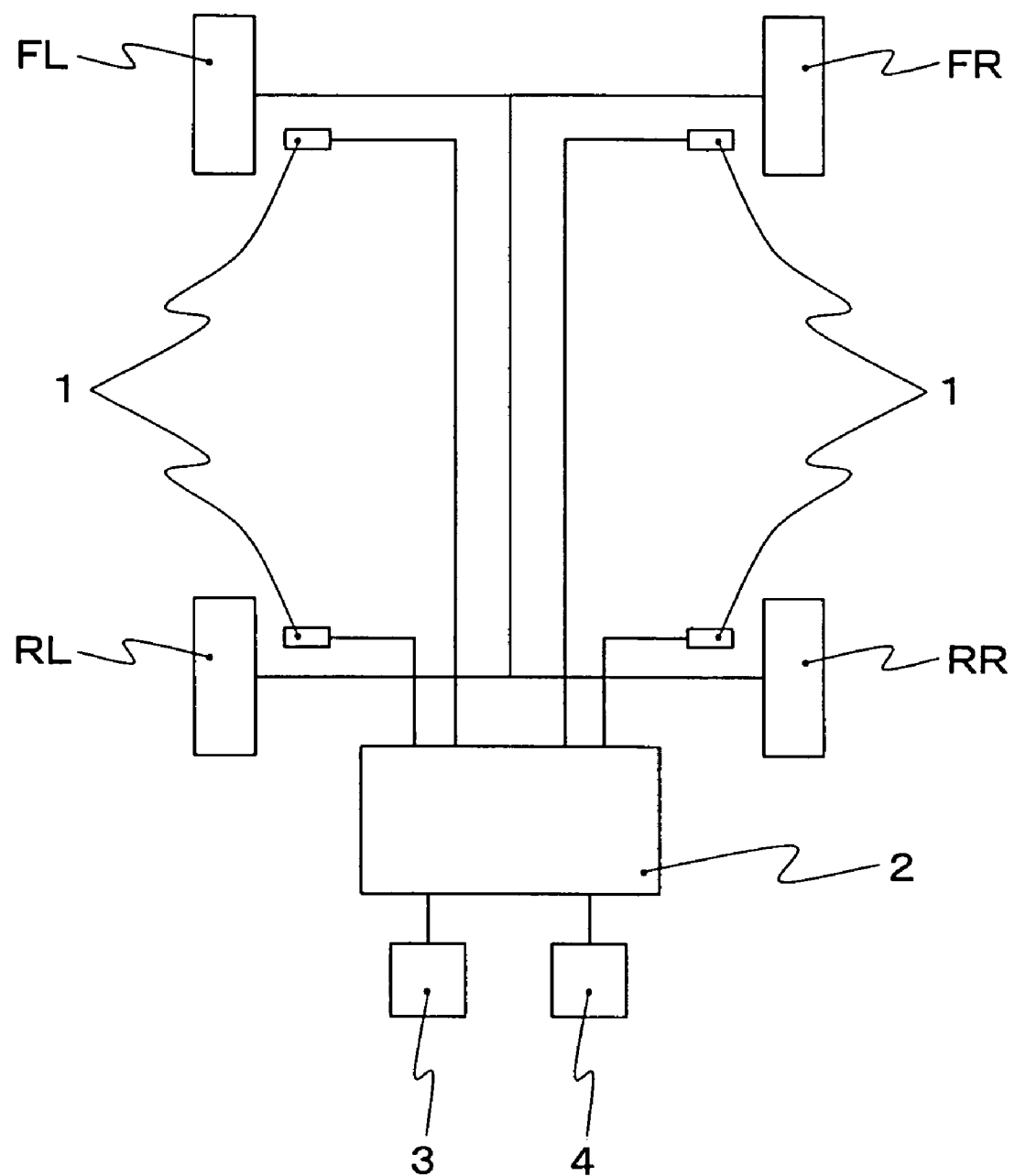
FIG. 1 is a block diagram showing one Embodiment of an apparatus for alarming abnormality in tire air-pressure according to the present invention.

FIG. 1 is a block diagram showing one Embodiment of an apparatus for alarming abnormality in tire air-pressure according to the present invention.

As shown in FIG. 1, an apparatus for alarming abnormality in tire air-pressure according to one Embodiment of the present invention detects whether or not air-pressure in four tires (front left tire (FL tire), front right tire (FR tire), rear left tire (RL tire) and rear right tire (RR tire)) provided on for example a vehicle are decreased. The apparatus for alarming abnormality in tire air-pressure includes wheel velocity sensors 1 which are conventional velocity detecting means provided with respect to each tire. The output of the wheel velocity sensor 1 is supplied to a control unit 2. To the control unit 2, an alarm 3 and an initialization switch 4 are connected. The above mentioned alarm 3 includes such as a liquid crystal display element, plasma display element or CRT for informing a tire having a decreased air-pressure. The above mentioned initialization switch 4 may be operated by a driver.

Figure 2:
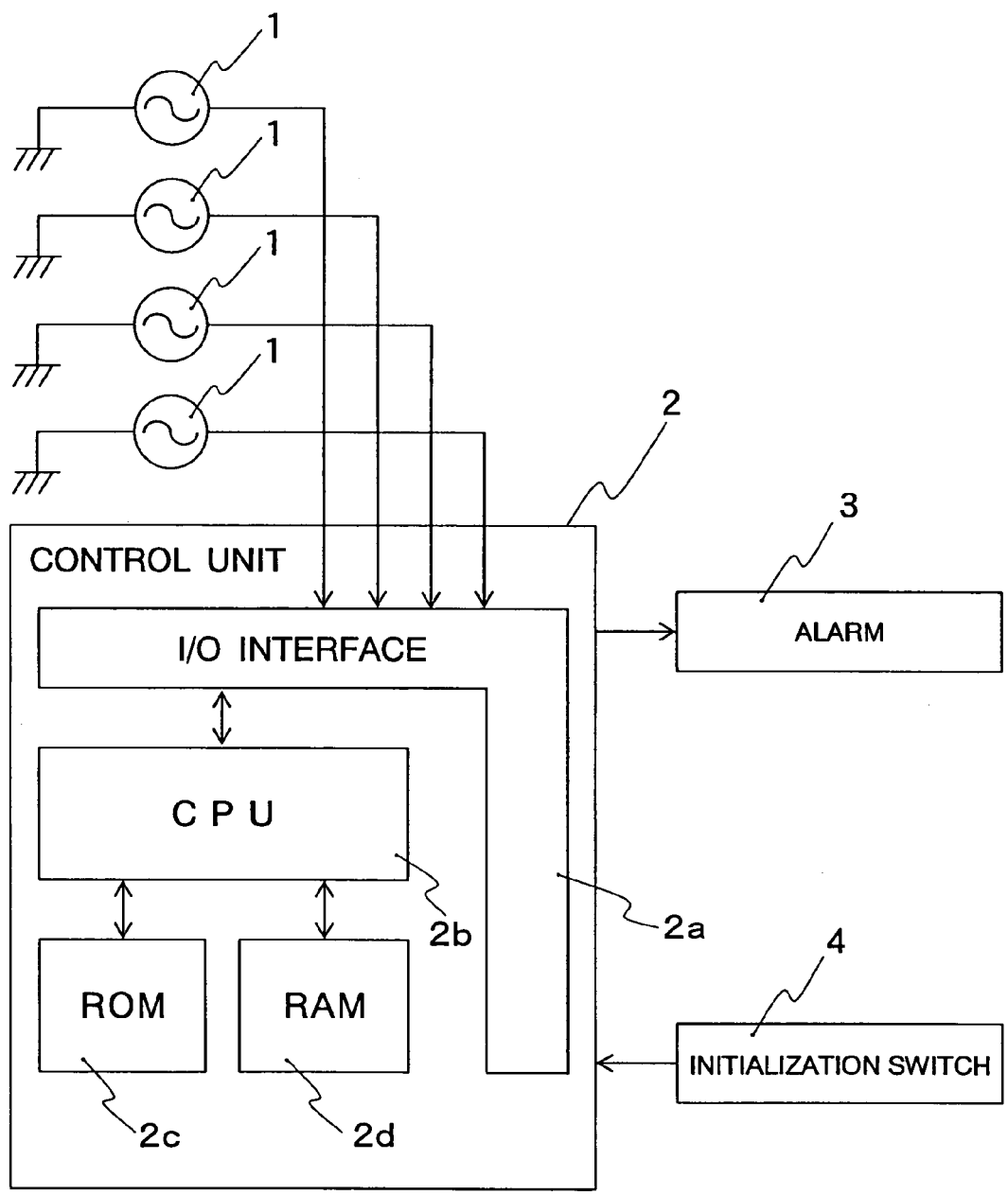
FIG. 2 is a block diagram showing an electrical configuration of an apparatus for alarming abnormality in tire air-pressure shown in FIG. 1.

The control unit 2 includes an I/O interface 2a which is required for sending/receiving a signal to/from an external device, a CPU 2b which functions as a center of calculation, a ROM 2c in which stores control operating programs for the CPU 2b, and a RAM 2d into which data is temporarily written and from which data is read out when the CPU 2b performs control operations (FIG. 2).

In the wheel velocity sensor 1, a pulse signal corresponding to the number of revolutions of a tire (hereinafter, referred to as wheel velocity pulse) is outputted. In the CPU 2b rotational angular velocities $F_i$ ($F_1$ to $F_4$) of four tires are calculated at specified sampling periods $\Delta T$ (sec), for example $\Delta T=1$ second, on the basis of the wheel velocity pulses which are outputted from the wheel velocity sensor 1. $F_1$ to $F_4$ show the rotational angular velocities of the FL tire, FR tire, RL tire and RR tire, respectively.

Since tires are manufactured to have variations within a standard (initial difference), effective rotational radii of respective tires (each value is obtained through dividing a distance that each tire advances in one revolution by $2\pi$) are not necessarily the same even when inner pressures of all tires are normal. The rotational angular velocities $F_i$ of respective tires thus vary. Therefore, the corrected rotational angular velocity $F1_i$ is calculated to calibrate the variation caused from the initial difference. In specific, the value is corrected as follows.

$F1_1 = F_1$ $F1_2 = mF_2$ $F1_3 = F_3$ $F1_4 = nF_4$

The correction coefficients m, n are obtained by calculating the rotational angular velocity $F_i$ under the condition when a vehicle is traveling straight, for example, and by calculating $m = F_1/F_2$ and $n = F_3/F_4$ based on the calculated rotational angular velocity $F_i$.

Thereafter, the rotational wheel velocity Vi is calculated based on $F1_i$.

The wheel with the slowest rotational velocity (slower tire) and the wheel with the fastest rotational velocity (faster tire) are obtained by the following equations.

$DEL(1) = \{(V1+V4)/2 - (V2+V3)/2\}/\{(V1+V2+V3+V4)/4\} \times 100 \ (\%)$ $DEL(2) = \{(V1+V2)/2 - (V3+V4)/2\}/\{(V1+V2+V3+V4)/4\} \times 100 \ (\%)$ $DEL(3) = \{(V1+V3)/2 - (V2+V4)/2\}/\{(V1+V2+V3+V4)/4\} \times 100 \ (\%)$ V1 to V4 respectively represent the wheel velocities of the front left tire (FL tire), front right tire (FR tire), rear left tire (RL tire) and rear right tire (RR tire) in the above equation.

Based on signs of the calculated determination values DEL (1) to (3), it is judged which wheel is either a slower wheel or a faster wheel as shown by Tables 1 and 2.

TABLE 1

| Tire with slowest rotational velocity | Sign of DEL_R | | |
|---|---|---|---|
| | DEL1_R | DEL2_R | DEL3_R |
| FR tire | + | − | + |
| FL tire | − | − | − |
| RR tire | − | + | + |
| RL tire | + | + | − |

TABLE 2

| Tire with fastest rotational velocity | Sign of DEL_R | | |
|---|---|---|---|
| | DEL1_R | DEL2_R | DEL3_R |
| FR tire | − | + | − |
| FL tire | + | + | + |
| RR tire | + | − | − |
| RL tire | − | − | + |

The wheel acceleration of a tire in Step (1) is calculated from the above-mentioned rotational wheel velocity.

The acceleration variation is an integrated value of 25 absolute values of acceleration which are obtained for every 40 milliseconds (i.e. integrated absolute values for 1 sec). In the case an integrated value of a certain tire is different from integrated values of other tires, it is determined that the air-pressure in the certain tire is abnormal (in particular the value of zero in air-pressure) (means (1)).

The calculated acceleration variations of respective tires are compared by subtracting or taking ratios of the obtained respective acceleration variations (means (2)).

As a result of the comparison, in the case where the acceleration variation of a certain tire is larger than the acceleration variations of the remaining tires, the certain tire is determined to have abnormal air-pressure (means (3)). Conventionally, it has been able to detect decrease in air-pressure since accelerations do not vary except when air-pressure is zero (with the exception of bad road). However, it has been not able to detect abnormality in air-pressure, in particular air-pressure of zero. On the other hand, the apparatus according to the present invention allows detecting that air-pressure of one wheel is zero by utilizing the fact that only the acceleration of a tire with the value of zero pressure varies (accelerations of two or more wheels vary in the case of a bad road).

Preferably, the means (3) determines that air-pressure of a tire is zero only in the case the acceleration variation of the tire is more than or equal to a threshold 1 and less than a threshold 2 derived by multiplying a coefficient which is at least 1 and the maximum acceleration variation among the acceleration variations of the remaining tires when acceleration variation of the tire is larger than the acceleration variations of the remaining tires. Such threshold is set by the result obtained through implementing a traveling test which uses a test vehicle provided with tires having normal air-pressure and a test vehicle provided with tires having air-pressure of 0 bar.

Moreover, preferably, the means (3) determines that air-pressure of a tire is zero in the case the acceleration variation of the tire is more than a threshold 3 and the maximum acceleration variation among the acceleration variations of the remaining tires is less than a threshold 4 when the acceleration variation of the tire is larger than the acceleration variations of the remaining tires. Such threshold is set by the result obtained through implementing a driving test which uses a test vehicle provided with tires having normal air-pressure and a test vehicle provided with tires having air-pressure of 0 bar.

The apparatus for alarming abnormality in tire air-pressure according to the present invention further includes means (4) of determining that tire air-pressure is abnormal, in particular that the value of air-pressure is zero, only in the case the rotational wheel velocity of the tire is fastest or slowest by comparing the rotational wheel velocity of the tire with the rotational wheel velocities of the remaining tires when air-pressure of the certain tire is determined to be abnormal by the means (3). For some reason, there is a case in which the tire with the largest acceleration variation and the tire whose rotational wheel velocity is the fastest or slowest do not correspond. In such a case, there may be no abnormal air-pressure, such as a case that the value of air-pressure is not zero. The means (4) is provided to avoid issuing a false alarm generated under the above condition.

The apparatus for alarming abnormality in tire air-pressure according to the present invention can abandon the detection of the value of zero in air-pressure according to the means (3) when a vehicle is traveling at high velocity (greater than 100 km/h). This is because the value of zero in air-pressure cannot be detected during high velocity travel.

One Embodiment of the present invention relates to a method for alarming abnormality in tire air-pressure including steps of (1) calculating the acceleration variations of respective tires from accelerations of the tires calculated by rotational wheel velocities; (2) comparing the calculated acceleration variations of the respective tires; and (3) determining air-pressure in a tire is zero when the acceleration variation of a tire is larger than the acceleration variations of the remaining tires as a result of comparison. The Embodiment can be implemented in the same manner as implemented in the apparatus for alarming abnormality in tire air-pressure according to the present invention.

Moreover, one Embodiment of the present invention relates to a program for alarming abnormality in tire air-pressure, making a computer execute the procedure of (1) calculating the acceleration variations of respective tires from accelerations of the tires calculated by rotational wheel velocities; (2) comparing the calculated acceleration variations of the respective tires; and (3) determining that the value of air-pressure in a tire is zero when the acceleration variation of the tire is larger than the acceleration variations of the remaining tires as a result of comparison. The Embodiment can be implemented in the same manner as implemented in the apparatus for alarming abnormality in tire air-pressure according to the present invention.

EXAMPLE

The present invention is explained in detail on the basis of Examples. However, the present invention is not limited to such Examples.

The conditions of a traveling test for confirming the performance of method for alarming abnormality in tire air-pressure of the present invention is shown. The test course is also shown.

(Experimental Condition)
Type of a test vehicle: FR vehicle for 2 persons
Tire size of front wheels: 245/40ZR18
Tire size of rear wheels: 265/35ZR18
Experiment location: Sumitomo Rubber Industries, Okayama test course and neighboring local straight roads (Test Vehicle)
An experiment was carried out by using a test vehicle A having tires with normal air-pressure and a test vehicle B having a FL tire with air-pressure of 0 bar (remaining tires have normal air-pressures).

<Traveling Test>

<Traveling Test of Test Vehicle A>
The traveling test using the test vehicles A and B will now be explained in the following. In the traveling test, data were calculated per 1 second for 130 seconds from the start of the test.

(FL Tire)
The calculation method of data at 1 second from the start of the test is shown as follows.

The rotational wheel velocities of the FL tire on the test vehicle A were detected 25 times for every 40 milliseconds during 1 second. Each of the 25 wheel accelerations was calculated from the obtained rotational wheel velocity, and the absolute values of respective wheel accelerations were obtained. The sum of 25 absolute values ($\Sigma$|FL Acc|) was then calculated as the sum of the absolute values of the FL tire acceleration at 1 second from the start of the test.

Moreover, the rotational wheel velocity of the FL tire at 1 second from the start of the test ($FL_1$) is calculated from the 25 rotational wheel velocities of the FL tire by utilizing a pulse signal outputed from a vehicle velocity sensor and sampling period.

With respect to the obtained (Σ|FL Acc|) and (FL₁), the rotational wheel velocity and the sum of the absolute values of acceleration were plotted on a graph in which the horizontal axis represents the rotational wheel velocity and the vertical axis represents the absolute value of acceleration (plot (FL₁)).

In the same manner as the above-mentioned calculation method at 1 second, plot data of the FL tire on the test vehicle A was created by plotting the data at 2 to 130 seconds from the start of the test on a graph.

(FR, RL and RR Tires)

In the same manner as the case for the "FL tire on the test vehicle A", data was plotted for every 1 second (1 to 130 seconds from the start of the test) to create the plot data of the FR, RL and RR tires on the test vehicle A.

Figure 3:
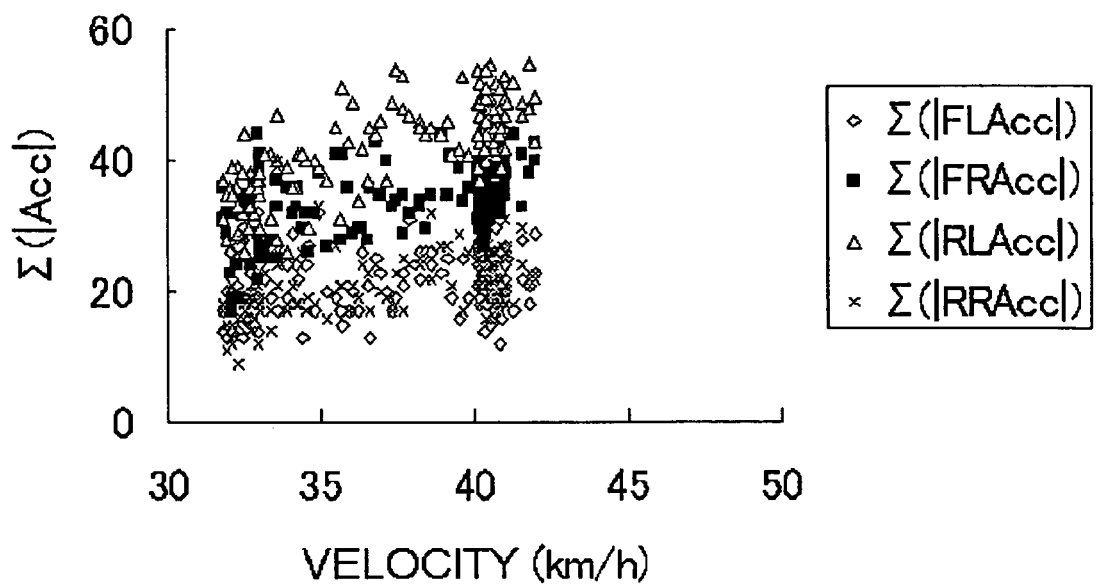
FIG. 3 is a view showing rotational wheel velocities and the sum of absolute values of accelerations of respective tires of a test vehicle A provided with tires with normal air-pressure.

The plot data of the vehicle A which was created in the above-mentioned manner is shown in FIG. 3.

<Driving Test of Test Vehicle B>

In the same manner as the "driving test of test vehicle A", plot data was created for the FL, FR, RL and RR tires on the test vehicle B. The test was carried out for 130 seconds from the start of the test. The plot data is shown in FIG. 4.

<Test Result>

In FIG. 3, the variation of (Σ|FL Acc|) of the test vehicle A was approximately 20, that of (Σ|FR Acc|) was approximately 30, that of (Σ|RL Acc|) was approximately 40 and that of (Σ|RR Acc|) was approximately 20. Therefore, the variations were approximately equal.

Figure 4:
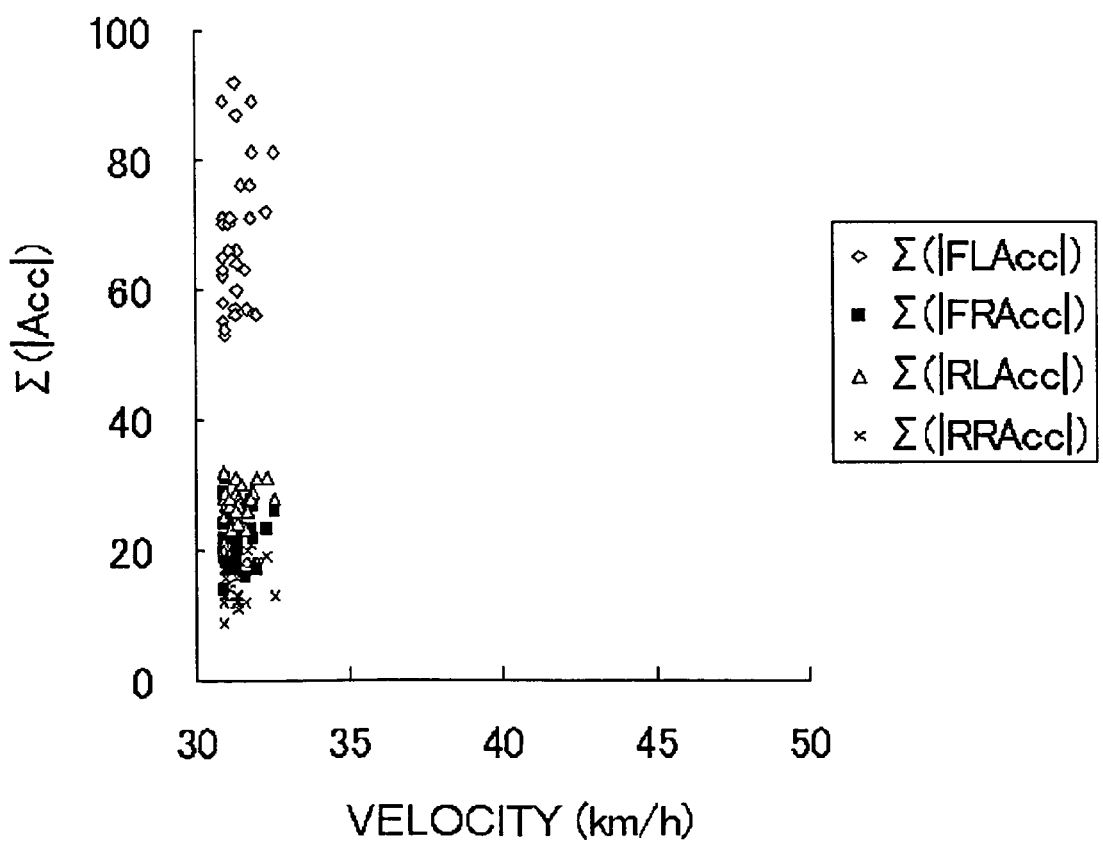
FIG. 4 is a view showing rotational wheel velocities and the sum of absolute values of accelerations of respective tires of a test vehicle B provided with tires with normal air-pressure.

On the other hand, in FIG. 4, the variation of (Σ|FR Acc|) was approximately 30, that of (Σ|RL Acc|) was approximately 30 and that of (Σ|RR Acc|) was approximately 20, and those variations were approximately equal. However, the variation of (Σ|FL Acc|) was approximately 70 and was different from other variations.

Accordingly, it is appreciated that a tire with zero air-pressure can be detected by setting a threshold for variation as 45 and a coefficient as 1.5.

Though several Embodiments of the present invention are described above, it is to be understood that the present invention is not limited only to the above-mentioned, various changes and modifications may be made in the invention without departing from the spirit and scope thereof.

What is claimed is:

1. An apparatus for alarming abnormality in tire air-pressure, comprising means of:
(1) calculating acceleration variations of respective tires from accelerations of the tires calculated by rotational wheel velocities; (2) comparing the calculated acceleration variations of the respective tires; and (3) detecting air-pressure in a tire is abnormal when the acceleration variation of the tire is larger than the acceleration variations of remaining tires as a result of comparison.

2. The apparatus for alarming abnormality in tire air-pressure according to claim 1, wherein the means (3) is a means of detecting that air-pressure of a tire is abnormal only in the case acceleration variation of the tire is more than or equal to a threshold 1 and less than a threshold 2 derived by multiplying a coefficient which is at least 1 and the maximum acceleration variation among the acceleration variations of the remaining tires when acceleration variation of the tire is larger than acceleration variations of the remaining tires.

3. The apparatus for alarming abnormality in tire air-pressure according to claim 1, wherein the means (3) is a means of detecting that air-pressure of a tire is abnormal in the case acceleration variation of the tire is more than a threshold 3 and the maximum acceleration variation among the acceleration variations of the remaining tires is less than a threshold 4 when acceleration variation of the tire is larger than acceleration variations of the remaining tires.

4. The apparatus for alarming abnormality in tire air-pressure according to claim 1, further comprising a means (4) of determining air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be abnormal by the means (3).

5. A method for alarming abnormality in tire air-pressure using an apparatus having vehicle wheel velocity sensors and a computerized control unit, comprising steps of:
(1) calculating acceleration variations of respective tires from accelerations of the tires calculated by rotational wheel velocities sensed by the wheel velocity sensors;
(2) comparing the calculated acceleration variations of the respective tires using the computerized control unit; and (3) using the computerized control unit to determine that air-pressure in a tire is abnormal when the acceleration variation of the tire is larger than the acceleration variations of remaining tires as a result of comparison.

6. The method for alarming abnormality in tire air-pressure using an apparatus having vehicle wheel velocity sensors and a computerized control unit according to claim 5, wherein the step (3) is a step of detecting that air-pressure of a tire is abnormal only in the case acceleration variation of the tire is more than or equal to a threshold 1 and less than a threshold 2 derived by multiplying a coefficient which is at least 1 and the maximum acceleration variation among the acceleration variations of the remaining tires when acceleration variation of the tire is larger than acceleration variations of the remaining tires.

7. The method for alarming abnormality in tire air-pressure using an apparatus having vehicle wheel velocity sensors and a computerized control unit according to claim 5, wherein the step (3) is a step of detecting that air-pressure of a tire is abnormal in the case acceleration variation of the tire is more than a threshold 3 and the maximum acceleration variation among the acceleration variations of the remaining tires is less than a threshold 4 when acceleration variation of the tire is larger than acceleration variations of the remaining tires.

8. The method for alarming abnormality in tire air-pressure using an apparatus having vehicle wheel velocity sensors and a computerized control unit according to claim 5, further comprising a step (4) of determining air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be abnormal in the step (3).

9. A program embodied in a computer readable medium for alarming abnormality in tire air-pressure, by making an apparatus having vehicle wheel velocity sensors and a computerized control unit execute the procedure of:
(1) calculating acceleration variations of respective tires from accelerations of the tires calculated by rotational wheel velocities; (2) comparing the calculated acceleration variations of the respective tires; and (3) detecting air-pressure in a tire is abnormal when the acceleration variation of the tire is larger than the acceleration variations of remaining tires as a result of comparison.

10. The program embodied in a computer readable medium for alarming abnormality in tire air-pressure according to claim 9, wherein the procedure (3) is a procedure of detecting that air-pressure of a tire is abnormal only in the case acceleration variation of the tire is more than or equal to a threshold 1 and less than a threshold 2 derived by multiplying a coefficient which is at least 1 and the maximum acceleration variation among the acceleration variations of the remaining tires when acceleration variation of the tire is larger than acceleration variations of the remaining tires.

11. The program embodied in a computer readable medium for alarming abnormality in tire air-pressure according to claim 9, wherein the procedure (3) is a procedure of detecting that air-pressure of a tire is abnormal in the case acceleration variation of the tire is more than a threshold 3 and the maximum acceleration variation among the acceleration variations of the remaining tires is less than a threshold 4 when acceleration variation of the tire is larger than acceleration variations of the remaining tires.

12. The program embodied in a computer readable medium for alarming abnormality in tire air-pressure according to claim 9, further comprising a procedure (4) of determining air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be abnormal in the procedure (3).

13. The apparatus for alarming abnormality in tire air-pressure according to claim 2, wherein the means (3) is a means of detecting that air-pressure of a tire is abnormal in the case acceleration variation of the tire is more than a threshold 3 and the maximum acceleration variation among the acceleration variations of the remaining tires is less than a threshold 4 when acceleration variation of the tire is larger than acceleration variations of the remaining tires.

14. The apparatus for alarming abnormality in tire air-pressure according to claim 2, further comprising a means (4) of determining air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be abnormal by the means (3).

15. The apparatus for alarming abnormality in tire air-pressure according to claim 3, further comprising a means (4) of determining air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be abnormal by the means (3).

16. The method for alarming abnormality in tire air-pressure using an apparatus having vehicle wheel velocity sensors and a computerized control unit according to claim 6, wherein the step (3) is a step of detecting that air-pressure of a tire is abnormal in the case acceleration variation of the tire is more than a threshold 3 and the maximum acceleration variation among the acceleration variations of the remaining tires is less than a threshold 4 when acceleration variation of the tire is larger than acceleration variations of the remaining tires.

17. The method for alarming abnormality in tire air-pressure using an apparatus having vehicle wheel velocity sensors and a computerized control unit according to claim 6, further comprising a step (4) of determining air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be abnormal in the step (3).

18. The method for alarming abnormality in tire air-pressure using an apparatus having vehicle wheel velocity sensors and a computerized control unit according to claim 7, further comprising a step (4) of determining air-pressure in a tire is abnormal, only in the case the rotational wheel velocity of the tire is fastest or slowest by comparing the rotational wheel velocity of the tire with the rotational wheel velocities of the remaining tires when air-pressure of the tire is determined to be abnormal in the step (3).

19. The program embodied in a computer readable medium for alarming abnormality in tire air-pressure according to claim 10, wherein the procedure (3) is a procedure of detecting that air-pressure of a tire is abnormal in the case acceleration variation of the tire is more than a threshold 3 and the maximum acceleration variation among the acceleration variations of the remaining tires is less than a threshold 4 when acceleration variation of the tire is larger than acceleration variations of the remaining tires.

\* \* \* \* \*